Jan. 14, 1969  E. G. ROCHOW  3,421,988

METHOD OF EMPLOYING SEMI-CONDUCTING CATALYSTS

Filed May 19, 1967

INVENTOR
EUGENE G. ROCHOW

BY Rines and Rines

ATTORNEYS 3,421,988
METHOD OF EMPLOYING SEMI-CONDUCTING CATALYSTS
Eugene G. Rochow, 37 Squire Road,
Winchester, Mass. 01890
Continuation-in-part of application Ser. No. 263,248,
Mar. 6, 1963. This application May 19, 1967, Ser.
No. 641,429
U.S. Cl. 204—164                      7 Claims
Int. Cl. B01k 1/00

ABSTRACT OF THE DISCLOSURE

Method and apparatus for controlling the catalytic action of a semi-conductor body upon a chemical medium, the current carriers within the body being varied by the application of electrical energy. The electrical energy may be applied, for example, by an alternating electric field, the period of which may be made equal to the reaction time of a chemical reaction in order to modify the reaction. By varying the periodicity and monitoring the reaction product the period corresponding to the reaction time may be determined.

---

This application is a continuation-in-part of our copending application for United States Letters Patent, Ser. No. 263,248, filed on Mar. 6, 1963, and now abandoned.

The present invention relates to methods of and apparatus for making use of semi-conductive catalysts in chemical reactions and the like; and, more particularly, to controlling the catalytic action of such devices by electric fields, electron injection, and similar mechanisms, as well as to novel semi-conducting catalysts themselves.

It has previously been observed that the electrical properties, such as conductivity, of various solid semi-conductor materials, such as, for example, cuprous oxide, zinc oxide, silicon, vanadium pentoxide, and the like, may be changed following the adsorption of gases such as, for example, oxygen or hydrogen, on the surfaces of such semi-conductor solids. If the adsorbed gas withdraws electrons from the surface atoms of the semi-conductor during the adsorption process, and the semi-conductor is of the N type in which the carriers are electrons, then the number of current carriers in the semi-conductor that remain free to pass current becomes decreased, so that the conductivity of the semi-conductor device becomes lowered. It the semi-conductor is of the P type, in which the carriers are electron deficiencies or "holes," then adsorption of an electron-withdrawing gas enhances the deficiency and hence increases the conductivity, as more fully explained hereinafter.

In the case of the N-type or P-type semi-conductor, moreover, the adsorption or release of other gases may vary the conductivity in an opposite manner to that above described. For example, the adsorption of hydrogen by an N-type semi-conductor results in the effective furnishing of additional electrons or current carriers and thus results in the increase of conductivity of the N-type semi-conductor. Hydrogen, on the other hand, will contribute electrons to a P-type semi-conductor, thereby, in effect, neutralizing some of the positive holes, which are the current carriers, resulting in a decrease in the conductivity of the P-type semi-conductor.

In accordance with the present invention, however, the existence of an effect that is the reciprocal or converse of the above-described phenomenon has been discovered. Specifically, it has been found that if current carriers in the semi-conductor solids can be materially removed or increased, gaseous and other media contacting the surface of the same can be adsorbed or desorbed from the surface under the control of the mechanism for removing or introducing carriers into the semi-conductor device. More partciularly, in a preferred embodiment of the invention, appropriate electric or electromagnetic fields applied to the semi-conductor solid may be used as a mechanism for controlling the adsorption and desorption of, for example, gaseous elements or compounds or mixtures to and from the surface of the semi-conductor devices. In effect, therefore, catalytic action of the semi-conductor devices in chemical processes can be varied and controlled in this manner.

While catalytic materials and various types of semi-conductors have previously been exposed to various types of radiant energy for a multitude of purposes, including the production of photoconductive or photochemical effects, the depositing of materials or impurities, the production of fluoresence or phosphorescence effects, the influence of gaseous chemical reactions, and numerous other purposes, these are not concerned with the kind of control of the catalytic action of semi-conductor solid devices with which the present invention is concerned. Similarly, previous schemes to bombard semi-conductors with electrons, to clean the surfaces thereof, or with ions, or other charged particles, or the utilization of the chemical coherer principle of early radio detection, while involving exposure to particulate or radiant energy, do not embrace the particular kind of control of semi-conductor catalytic action herein described, in accordance with which the catalytic action of appropriate semi-conductor solid materials and the like may be rendered more effective, and the operation of the same may even be matched to the chemical reaction rate of a process with which it is employed, so that a positive and definitely ascertainable degree of control over the catalytic action of the semi-conductor device may be attained.

Other and further objects of the invention will hereinafter be set forth and will be more particularly pointed out in connection with the appended claims.

The invention will now be described with reference to the accompanying drawings, FIG. 1 of which is a combined longitudinal section and schematic circuit diagram of a preferred form of the invention;

As used in this application, the term "semi-conductor" is intended to embrace all solid bodies which conduct electric current by means of electrons or "positive holes," as distinct from metallic conduction or ionic conduction; such electronic conduction being of opposite temperature coefficient to that exhibited by metals. Semi-conductors are thus defined herein not in terms of degrees of conductivity, but, rather, in terms of an increase in electronic-type conductivity with rising temperature, as distinct from metals, which show an electronic conductivity which decreases with rising temperature. Such solid semi-conductors may be classified conveniently as intrinsic and extrinsic in character; the intrinsic semi-conductor being an element or a compound which, in the purest state attainable, shows non-ionic electrical conductivity having the positive temperature coefficient described above; and the extrinsic semi-conductor being a substance which alters the degree or even the type of semi-conduction under the influence of impurities or modifying agents introduced into the main body of the substance for that purpose. As is well known in the art, an intrinsic semi-conductor, such as elementary germanium, shows extrinsic behaviour when appropriate impurities are introduced in desired amount, becoming an N-type semi-conductor upon the introduction of an electron deficient impurity, such as boron. In the same manner, other semi-conductors, such as silicon, zinc oxide, copper oxide, lead sulfide, silver iodide and selenium, may be altered in their semi-conduction properties, even to the extent of being changed from N-type to P-type, by the introduction of appropriate impurities in the desired amounts.

Turning, now, to chemical reactions and to the solid substances which have catalytic effect upon the rate or the course of such reactions (or both), it is found that such heterogeneous catalysts often are semi-conductors in their electrical nature. As has been mentioned briefly above, the degree of electrical conduction in such semi-conducting catalytic solid bodies has, in some cases, been demonstrated to increase or decrease upon chemisorption of appropriate gases from the surrounding gaseous environment, in accordance with the expectations of semi-conductor theory and chemical bonding of the adsorbed gas. The present invention pertains, however, to the purposeful influence or control of such chemisorption or desorption by control of the electron density within the solid by any appropriate means; for example, by injecting electrons or holes within the solid body through the agency of a system of electrodes, or by the establishment of a suitable electric potential field.

Figure 1:
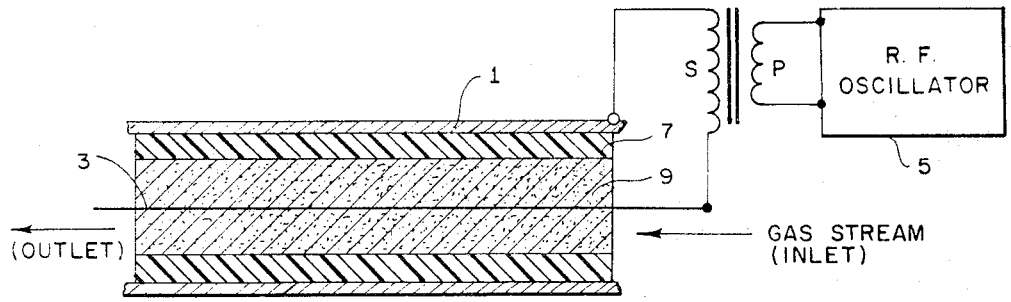

Referring, for example, to FIG. 1, a conductive tubular cylindrical housing 1 is shown interiorally provided with a coaxially disposed substantially central electrode 3. The housing 1 serves as a first electrode connected to one terminal of the secondary winding S of, for example, a radio frequency transformer, the primary winding P of which is connected to a radio-frequency source or oscillator 5. The other terminal of the secondary winding S connects with the internal electrode 3 to apply the radio-frequency field between the electrodes 1 and 3.

Surrounding the inner electrode 3 and contained between the same and the inner walls of the outer electrode 1, but preferably insulated therefrom by an insulating layer 7, is a medium 9 of relatively loosely packed pellets or granules of solid semi-conductor material of the above-described character. The purpose of the relatively loose packing of the semi-conductor units resides in the desire to pass a gas stream longitudinally through the tubular electrode 1, in the direction of the arrows, from "inlet" to "outlet," which gas is to be subjected to the catalytic action of the semi-conductor medium 9. As an illustration, let it be assumed that a mixture of sulfur dioxide and oxygen (or air) is being forced through the reactor body 9 at a temperature at which the oxidation to sulfur trioxide may be accomplished by the heterogeneous semi-conducting catalyst 9. For this illustration the body 9 may consist substantially of vanadium oxide.

Since the catalytic action consists in the adsorption of sulfur dioxide and oxygen, followed by their chemical combination and then their desorption or expulsion from the surface of the vanadium oxide 9, it is seen that the degree of reaction per unit time may be increased by intensifying the chemisorption of the reagents upon the surface of the body 9, followed by deliberate expulsion of the sulfur trioxide product from the same surface once the reaction is complete. For this purpose, the alternating electric field within the reactor body 9, produced by the oscillator 5, is made to reverse or alternate at a frequency the period of which is adjusted approximately equal to the time required for reaction on the catalyst's surface, thus alternately increasing and decreasing the density of current carriers within the semi-conductor body 9. Without such electrical control or manipulation of the semi-conductor catalyst 9, the adsorption and desorption processes would take place at an uncontrolled rate under the random influence of thermal agitation of gas molecules striking the surface. By imposing electrical control of the adsorption and desorption processes, the residence time of the gases on the surface of the solid body 9 is limited quite strictly to the time required for reaction, thereby freeing the catalyst surface 9 periodically for fresh reaction and consequently increasing the output of the desired sulfur trioxide from the given amount of catalyst in the reactor body.

It should be clearly understood that the adsorption and desorption of gases at the surface of a semi-conductor body 9, according to the purposes of this invention, is not confined to the use of a radio-frequency potential at electrodes 1 and 3. For example, the principle or effect would be shown even by imposing a steady invarying electric field within the semi-conductor body 9, as by application of a direct current potential to electrodes 1 and 3. The opposite effect would then result from a reversal of the polarity of application of such direct-current potential to the same electrodes. When the principles of the invention are to be applied to the control of a chemical reaction, however, it becomes important to reverse the direction of the electric field at a rate commensurate with the time of chemical reaction which occurs on the surface of the semi-conductor catalyst 9, so that the surface may be freed of reaction products and made ready for the adsorption of fresh reactants as quickly as possible. When the reaction time is, for example, of the order of magnitude of a micro-second (as is the case in many chemical reactions, such as the synthesis of ammonia), the frequency of the alternation of the electric field must be of the order of one megacycle per second. Reactions which require a longer time for their consummation would require a correspondingly slower frequency of alternation of the electric field; and, conversely, reactions which require a shorter time would appropriately require a higher frequency of alternation of the field.

Indeed, apart from the purposes above described, the phenomenon underlying the invention and the apparatus of FIG. 1 may be beneficially used to determine chemical reaction times by varying the frequency of the oscillator 5 until a substantial increase in the output of the reaction product is found by chemical analysis. This can be accomplished by observing continuously, by means of a gas-phase chromatograph, the composition of the effluent gas stream at the "outlet," or, for example, by continuous observation of the infrared adsorption spectrum. The determination of such minimum times of reaction is of great theoretical interest in defining the mechanism of reaction, and is also of importance in the development of improved catalytic materials for the conduct of commercially important chemical reactions.

Figure 3:
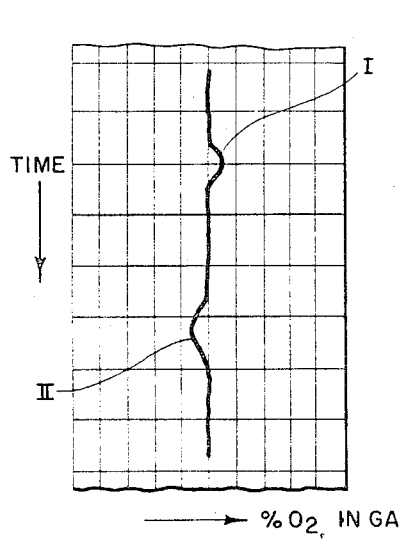
FIG. 3 is an experimentally attained graph of gas composition as a function of time, demonstrating the change in composition of a gas issuing from a cell containing a solid semi-conductor catalyst controlled in accordance with the present invention.
Figure 4:
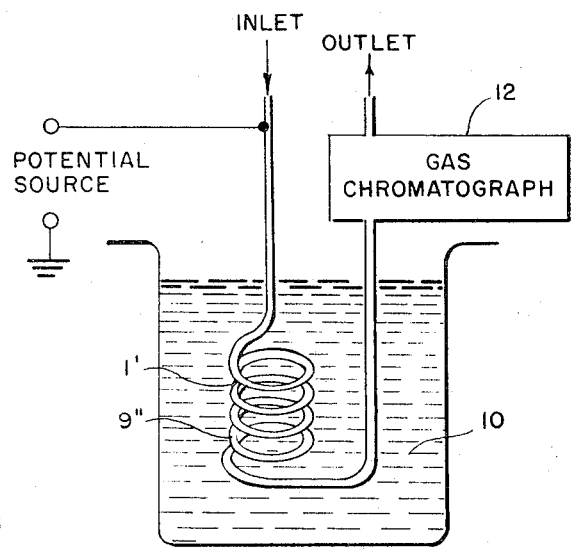
FIG. 4 is a view similar to FIG. 2, but on a different scale, of a further modification.

As another example, reference is made to the apparatus of FIG. 4, which produced the experimental results plotted in FIG. 3. In this embodiment, the metal conductive tubular housing 1' was a copper tube oxidized on the inside to provide a layer of copper-oxide semi-conductor catalytic material 9" in accordance with the known art of establishing such catalytic surfaces, as described, for example, in Zeitung Naturforschung, vol. XA, page 152, 1955; Journal of the Electrochemical Society, vol. 105, page 18; Transactions Faraday Society, vol. 54, page 1703, 1958. The tube 1' was coiled and immersed in an oil heating bath 10 maintained at about 250° C. in preparation for reduction-oxidation reactions. In order to test the adsorption-desorption properties of the copper-oxide catalytic coating or body 9" under the action of an electric field, a mixture of oxygen and helium was passed into the "inlet," through the tube 1', and thence to the sensing element of a gas chromatograph 12, at the "outlet," adjusted to respond to small changes in the oxygen level of the helium carrier gas. In this experiment, the copper-oxide coating 9" was saturated with oxygen by passing the helium-oxygen mixture through it until no further change in gas composition was shown on the chromatograph recording. Without alteration of the gas composition or rate, a D.C. electric potential was applied for a limited time to the copper tube 1', with respect to ground, at a predetermined instant of time. At a time which corresponded exactly with the transit time required for the gas stream to emerge from the copper tube 1' and reach the sensing element of the chromatograph 12, a deflection of the recorder pen indicated an increase in oxygen content of carrier gas, as shown at I in FIG. 3.

After equilibrium had again been established, the D.C. potential with respect to ground was reversed. Again, after the lapse of the appropriate time interval, corresponding to the transit time of the gas, the recorder pen showed a decrease in the oxygen content of the gas stream, as indicated by the opposite deflection II in FIG. 3.

Figure 2:
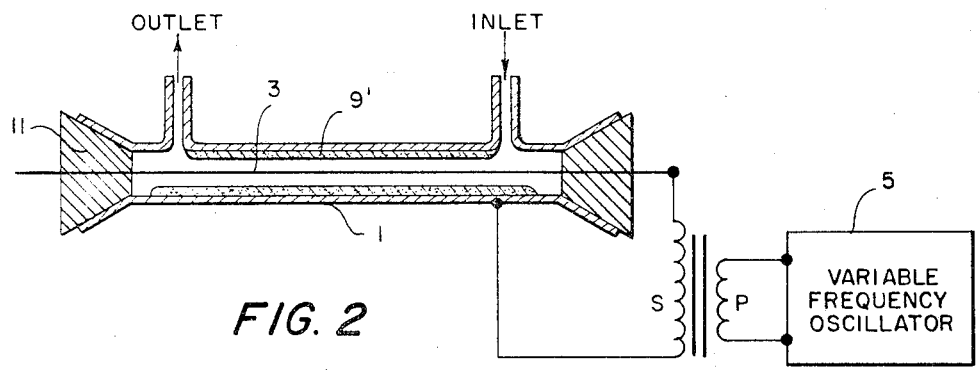
FIG. 2 is a similar view of a modification.

The utilization of a wall lining 9'' of catalytic material, FIG. 4, in contradistinction to the granular medium of FIG. 1, is also shown in the modification of FIG. 2, wherein the semi-conductor material is applied as a coating 9' to the inner walls of the outer electrode housing 1. The tube is shown stoppered at its ends 11 and is connected to a variable frequency oscillator 5, as in the embodiment of FIG. 1, the frequency variation being useful for adjustment to chemical reaction rate, as before described. Other reversible-polarity fields may also be employed, including the reversible D.C. field of the embodiment of FIG. 4.

As still another example, it should be observed that the same doping or provision of impurities that has been so widely employed in the field of semi-conductors for other applications, finds utility in accordance with the practice of the method underlying the present invention. For example, in connection with the embodiment of FIG. 1, and the illustrative example of the vanadium oxide catalyst, traces of potassium oxide may be incorporated into the vanadium oxide for the purpose of enhancing the effectiveness of the catalytic activity; the electric field control again enhancing the effective catalytic action of the semiconducting medium 9.

While the invention has been described in connection with gaseous fluids and reactions in the gas phase, it is to be understood that other fluid reactions which are adapted to enable the reactants to come into contact with the surface of the catalytic body material may also be employed. For example, one or more of the reactants may be a liquid which reacts with a gas or another liquid at the surface of the heterogeneous catalyst employed according to the teachings of the invention. Similarly, semi-conductor layers of different characteristics, such as N- and P-type semiconductors, may both be employed as where it is desired to produce an enhanced and a decreased catalytic effect at different regions of the reaction chamber in response to the same or separate electric fields. While the above-described types of electric or electromagnetic field excitation are preferred because of their ready penetration into the semi-conductor material to affect the current carriers within the semi-conductor body, other types of energy that give rise to this internal control of the carrier density within the semi-conductor material may also be used. Pulsating and other types of electric-field-producing circuits may also be employed.

Further modifications will occur to those skilled in the art and all such are considered to fall within the spirit and scope of the invention as defined in the appended claims.

What is claimed is:

1. A method of controlling the catalytic action of a semiconductor body upon a chemical medium in which a predetermined chemical reaction occurs in the absence of such control, that comprises, causing such chemical reaction to occur, contacting a surface of the body with the medium, and, during such contacting and such occurrence of the chemical reaction, varying the density of current carriers comprising electrons and holes within the semiconductor body by applying electrical energy to the said body of a value which produces an electrical potential gradient within the said body and thereby produces corresponding variations of said current carriers at said surface in order to control the catalytic action of said body and to modify said chemical reaction.

2. A method as claimed in claim 1 and in which said reaction has a predetermined reaction time, and the period of said varying is limited to said reaction time.

3. A method as claimed in claim 1 and in which said varying of the density of current carriers comprises subjecting the body to an electrical field.

4. A method as claimed in claim 3 and in which said reaction has a predetermined reaction time and the said electrical field has a period substantially equal to the said reaction time.

5. A method as claimed in claim 4 and in which the said reaction time is of the order of a microsecond and the frequency of the said field is of the order of a megacycle.

6. A method as claimed in claim 1 and in which the said medium is gaseous and the said catalytic action includes one of gaseous adsorption and desorption to and from the said surface.

7. A method comprising contacting a surface of a semiconductor body with a chemical medium within which a chemical reaction of unknown reaction time is taking place, during such contacting subjecting the body to a periodically varying electrical field that correspondingly varies the density of current carriers within and at the said surface of the semi-conductor body, varying the periodicity of the electrical field, and monitoring the reaction product of the medium during the said periodic varying to determine that period which corresponds substantially to the said reaction time.

References Cited

UNITED STATES PATENTS

| 1,489,724 | 4/1924 | Wendt | 204—177 |
| 2,684,329 | 7/1954 | Rouy | 204—164 |
| 3,003,939 | 10/1961 | Rouy et al. | 204—164 |
| 3,205,162 | 9/1965 | MacLean | 204—165 |

FOREIGN PATENTS

| 353,455 | 7/1931 | Great Britain. |
| 354,736 | 8/1931 | Great Britain. |

JOHN H. MACK, *Primary Examiner.*

H. M. FLOURNOY, *Assistant Examiner.*